(12) United States Patent
Zimon et al.

(10) Patent No.: US 11,079,249 B1
(45) Date of Patent: Aug. 3, 2021

(54) HAPTIC NAVIGATION DEVICE

(71) Applicant: INTERNATIONAL BUSINESS MACHINES CORPORATION, Armonk, NY (US)

(72) Inventors: Malgorzata Jadwiga Zimon, Warrington (GB); James McDonagh, Frodsham (GB); Breanndan O'Conchuir, Warrington (GB); Robert Sawko, Warrington (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/120,315

(22) Filed: Dec. 14, 2020

(51) Int. Cl.
| | | |
|---|---|---|
| *H04B 3/36* | (2006.01) |
| *G01C 21/36* | (2006.01) |
| *G06F 3/01* | (2006.01) |
| *G06F 1/16* | (2006.01) |
| *H04W 4/024* | (2018.01) |
| *H04W 4/02* | (2018.01) |
| *H04W 4/029* | (2018.01) |
| *H04W 4/021* | (2018.01) |

(52) U.S. Cl.
CPC ......... *G01C 21/3652* (2013.01); *G06F 1/163* (2013.01); *G06F 3/014* (2013.01); *G06F 3/016* (2013.01); *H04W 4/021* (2013.01); *H04W 4/024* (2018.02); *H04W 4/027* (2013.01); *H04W 4/029* (2018.02)

(58) Field of Classification Search
CPC .. G01C 21/3652; H04W 4/024; H04W 4/029; H04W 4/021; H04W 4/027; G06F 1/163; G06F 3/014; G06F 3/016

USPC ...................................................... 340/407.1
See application file for complete search history.

(56) References Cited

U.S. PATENT DOCUMENTS

| | | | | |
|---|---|---|---|---|
| 2004/0160414 | A1* | 8/2004 | Armstrong | ............ G06F 3/0346 345/156 |
| 2012/0038468 | A1* | 2/2012 | Provancher | ............. G06F 3/016 340/407.1 |
| 2012/0038495 | A1* | 2/2012 | Ishikawa | ............. G06F 3/03549 341/20 |

(Continued)

FOREIGN PATENT DOCUMENTS

GB      2489906 A     9/2010

OTHER PUBLICATIONS

Elmannai et al., "Sensor-Based Assistive Devices for Visually-Impaired People: Current Status, Challenges, and Future Directions", sensors, Sensors (Basel). Mar. 2017; 17(3): 565, Published online Mar. 10, 2017. doi: 10.3390/s17030565, 65 pages.

(Continued)

*Primary Examiner* — Naomi J Small
(74) *Attorney, Agent, or Firm* — L. Jeffrey Kelly

(57) ABSTRACT

A navigation device including a housing including an opening, two or more drive wheels, and two or more rollers, a spherical member located within the opening of the housing in direct contact with the two or more drive wheels and the two or more rollers such that the drive wheels control rotation of the spherical member in response to guidance signals received from a processor, and an attachable member coupled directly to the housing for securing the navigation device to a body part of a user and maintaining contact between the user's skin and the spherical member.

20 Claims, 8 Drawing Sheets

(56) References Cited

U.S. PATENT DOCUMENTS

| | | |
|---|---|---|
| 2013/0218456 A1 | 8/2013 | Zelek |
| 2014/0313021 A1 | 10/2014 | Radivojevic |
| 2015/0123775 A1* | 5/2015 | Kerdemelidis .......... G08B 6/00 340/407.1 |
| 2015/0153179 A1 | 6/2015 | Bolzmacher |
| 2018/0188850 A1* | 7/2018 | Heath ................ A63B 71/0622 |
| 2018/0217067 A1 | 8/2018 | Gallager |

OTHER PUBLICATIONS

Mell et al., "The NIST Definition of Cloud Computing", Recommendations of the National Institute of Standards and Technology, Special Publication 800-145, Sep. 2011, 7 pages.

Rosebrock, "Find distance from camera to object/marker using Python and OpenCV", Accessed on Sep. 10, 2020, 110 pages.

Wikipedia, "Spherical coordinate system", https://en.wikipedia.org/wiki/Spherical_coordinate_system, Accessed on Sep. 10, 2020, 11 pages.

World Health Organization, "Global Data on Visual Impairments 2010", © World health Organization 2012, 17 pages.

* cited by examiner

US 11,079,249 B1

HAPTIC NAVIGATION DEVICE

BACKGROUND

The present invention relates to navigation devices, in particular to a wearable, haptic navigation device.

Navigation systems have become an integral part of everyday life as well as being essential to modern professions. GPS-based navigational systems are embedded in conventional smart phones, smart watches and smart wearables. Navigational systems allow users to route themselves, their vehicles or other devices to a desired destination with real-time guidance throughout the journey.

Conventional navigation systems typically include a visual display of the journey, accompanied by visual and auditory alerts and guidance as to which direction the user should go to next. These systems assume that the user has the ability to visually or auditorily receive the guidance messages. Users with visual or hearing impediments, or users who are undergoing a task that doesn't allow them to look at a screen or listen to alerts are not able to use conventional screen-based navigational systems.

SUMMARY

Embodiments of the present invention describe a haptic navigation device that allows a user to be guided to their destination via haptic feedback and method of using the same. The haptic navigation device includes a housing including an opening, two or more drive wheels, and two or more rollers, a spherical member located within the opening of the housing in direct contact with the two or more drive wheels and the two or more rollers such that the drive wheels control rotation of the spherical member in response to guidance signals received from a processor, and an attachable member coupled directly to the housing for securing the navigation device to a body part of a user and maintaining contact between the user's skin and the spherical member.

DESCRIPTION OF THE DRAWINGS

Embodiments of the present invention will now be described, by way of example only, with reference to the following figures.

DETAILED DESCRIPTION

Figure 1:
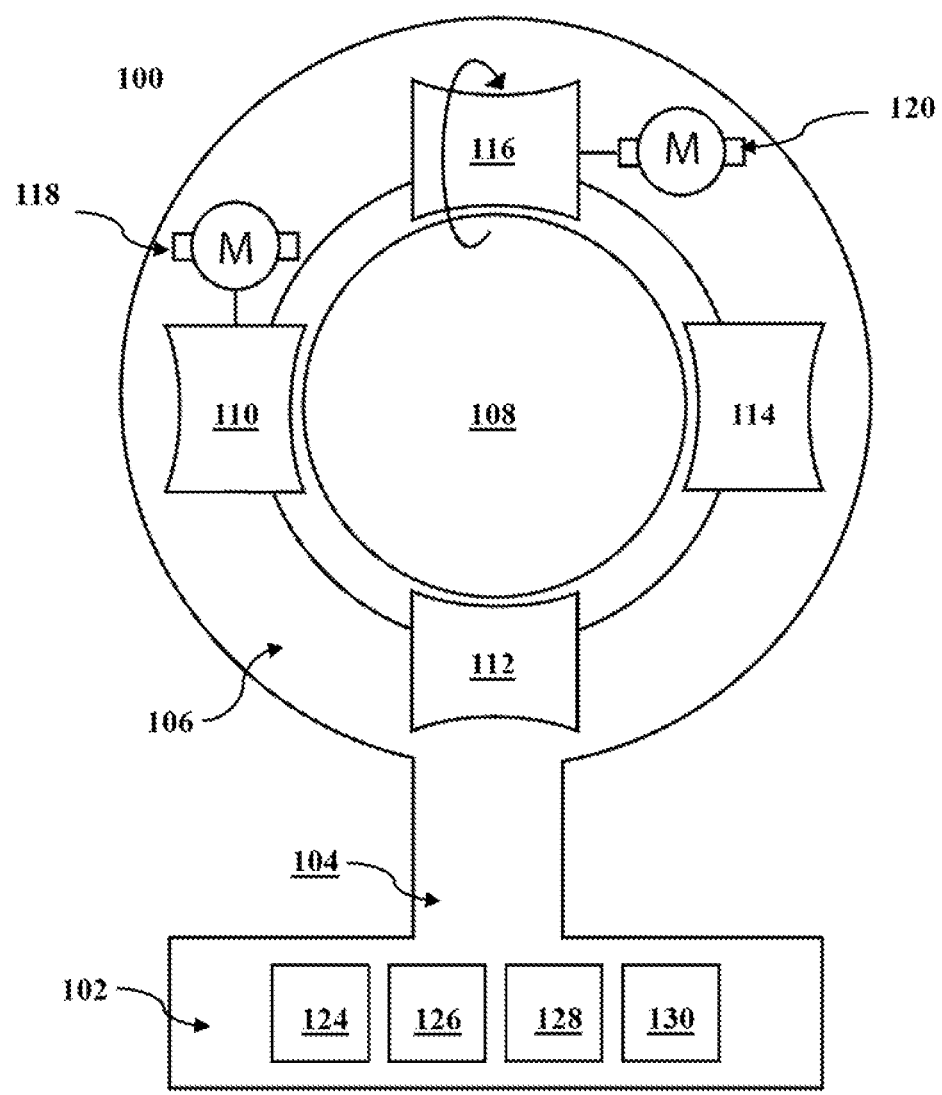
FIG. 1 is a top down view of a haptic navigation device in accordance with an embodiment of the invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper", "lower", "right", "left", "vertical", "horizontal", "top", "bottom", and derivatives thereof shall relate to the disclosed structures and methods, as oriented in the drawing figures. The terms "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

Traditional navigation solutions for users who are visually impaired include the use of a handheld cane, the use of assistant animals such as a guide dog, or a fully auditory navigation system, where the navigation messages, for example a set of navigational instructions, are communicated via auditory guidance messages. For users with visual impairments, it is important that they are able to receive guidance messages in a way that doesn't obstruct them from holding a cane or the leash of their guide animal.

Haptic technology uses vibrations, force and motions to communicate to a user. Recent navigational systems incorporate haptic technology into their solutions. An example is an existing rotating haptic navigation device, specifically designed for visually impaired users. The device includes two parts where the top part rotates left and right in relation to the bottom member, about one rotational axis that passes through the center of both parts. When the user needs to turn left or right, the rotating haptic navigation device rotates to point left or right respectively. The drawback of this solution is that it must be held in the user's hand, which impedes the user's ability to use that hand.

Another drawback of the rotating haptic navigation device is that it only works if the device is held in the correct orientation, i.e. held in front of the user in the user's palm, with the palm of the user facing upwards. The rotating haptic navigation device impedes the user from freely using their hand and arm; this is especially important if they are holding a cane or leash in their other hand.

Wearable devices solve the problem of needing to hold the device in the user's hand. One such example of a vibrating, wearable haptic navigation device is a strap device worn by a user with two vibrational areas. Depending on the route of the user, the strap device vibrates in the direction the user needs to turn. Another example of a vibrating, wearable haptic navigation device is a wearable pendant, where that the user experiences vibrations on their neck depending on the direction the user needs to turn. These wearable haptic devices allow users to navigate themselves via haptic feedback.

A drawback of both the existing rotating haptic navigation devices and vibrating haptic navigation devices is the limited degree of movement they provide to communicate the route to the user. As the rotating haptic navigation devices are only able to move in one rotational axis, the top part can only move in one plane and can only convey two signals or directions; left and right. Similarly, the two vibrational areas of the vibrating haptic navigation devices can only convey two signals or directions; left and right.

Disclosed herein is a haptic navigation device which rotates a spherical member against a user's body part, communicating to the user a direction that the user needs to move to get to their destination. The direction of the rotational movement and the speed of the spherical member may convey the angle of direction the user needs to move. The haptic navigation device can be handheld, or the haptic navigation can be attached to a user's body part, such as the user's wrist, arm, torso or legs via an attachable member.

Referring now to FIG. 1, a haptic navigation device 100 is shown according to embodiments of the present invention. The haptic navigation device 100 is designed to receive a navigation message, for example navigational directions, and translate the navigation message into rotational movement which can be physically recognized by a user. The haptic navigation device 100 includes a strap 102, an extension member 104 extending from the strap 102, a housing 106 at the extremity of the extension member 104, a spherical member 108 suspended in the center of the housing 106, supported for rotational movement about an axis of rotation that passes through the center of the spherical member 108.

As may be used herein, the terms "rotating" and "spinning" may be used interchangeably to describe the movement of the spherical member 108 within the housing 106 of the haptic navigation device 100.

The spherical member 108 preferably has a shape and texture which allows full rotational movement within the housing 106 in all directions. The surface of the spherical member 108 may be smooth, or it may have a texture such as, for example, tactile ridges or tactile grooves, to aid with communicating the haptic feedback to the user. The components of the haptic navigation device 100 are arranged such that at least a portion the spherical member 108 is in contact with the user's body part, for example, the palm of their hand. The housing 106 has an opening, exposing a portion of the spherical member 108, such that the exposed portion of the spherical member 108 is in contact with a body part of a user.

The housing 106 includes a circular shape, however, the housing 106 can be any shape and dimension as long as it allows the spherical member 108 to rotate freely within the housing 106, and the housing 106 is able to be comfortably attached to the user's body part.

The strap 102 may be made of a flexible material that is able to wrap around the user's body part. Suitable flexible materials may include, for example, fabric, plastic or composite materials. Alternatively, the strap 102 may include a rigid material that is shaped to fit the user's body part, such as, for example, plastic or a metal material. The strap 102 may further include a stretchable component to allow the haptic navigation device 100 to be securely attached to the user's wrist, or may further include an attachable mechanism, such as, for example, a buckle (e.g. watch strap), hook-and-loop fasters, snap fasteners, buttons with buttonholes for holding the strap around the user's body part.

Similarly, the extension member 104 may include a flexible or rigid material for connecting the housing 106 to the strap 102, such as, for example, fabric, plastic or a composite material. In some cases, the haptic navigation device 100 may have a flexible strap 102 and a rigid extension member 104 to support the housing 106 in place of the user's palm. In other cases, the haptic navigation device 100 may have a spring-loaded flexible extension member 104 to guarantee positive contact between the spherical member 108 and the user's body part is maintained. If contact between the spherical member 108 and the user's body part is ever lost, there is a potential some of the navigation message (i.e. directions) may not be fully communicated to the user. Lastly, the spring-loaded extension member 104 need not include a spring, but instead include an elastic material in such a shape that would act like a spring to hold the spherical member 108 against the user's body part. More specifically, an extension member made form an elastic material would flex like a spring without experiencing any plastic deformation.

As disclosed herein, the attachable member includes the strap 102 and the extension member 104. In other embodiments, the attachable member is a re-usable, sticky adhesive component arranged on one side of the housing 106, such that the haptic navigation device 100 sticks to the user's body part. In yet another embodiment, the attachable member is a wearable component, such as a glove or arm band, where the haptic navigation device 100 is integrated or embedded into the wearable component, for example, an article of clothing. Those skilled in the art will appreciate that there are various attachable member arrangements capable of attaching the housing 106 and the spherical member 108 to the user's body part.

The housing 106 includes motors 118, 120 (hereinafter "motors") which control drive wheels 110, 116 (hereinafter "drive wheels") in physical contact with the spherical member 108. The drive wheels 110, 116, which are controlled by the motors 118, 120 respectively, spin to rotate the spherical member 108 continuously in the direction of the guidance signal sent from the processor 124.

The housing 106 further includes multiple rollers 112, 114. The rollers 112, 114 spin freely and are not connected to a motor. All of the drive wheels 110, 116 and the rollers 112, 114 provide support for the rotational movement of the spherical member 108. As illustrated, the drive wheels 110, 116 and the rollers 112, 114 are all coupled to the housing 106 and arranged in a single plane, in accordance with an embodiment of the present invention. In some embodiments, the drive wheels 110, 116 and the rollers 112, 114 may not all be arranged in a single plane. In all cases, the drive wheels 110, 116 and the rollers 112, 114 must be arranged in a manner to facilitate rotation of the spherical member 108 sufficient to communicate the navigation message, as described above. The motors 118, 120 engage in different combinations to allow the spherical member 108 to rotate in any combination of directions to facilitate communication of the navigation message to the user.

In addition to the drive wheels 110, 116 and the rollers 112, 114, the spherical member 108 can be further supported on top and bottom by a low friction ring. In some cases, the housing 106 may include two openings, one on top and one on bottom, where the spherical member 108 would be exposed. In such cases, each opening may have a low friction ring disposed at the edge of the openings to support free rotation of the spherical member 108.

In another embodiment, the housing 106 may include only a single opening on the bottom in which case the spherical member 108 would be completely covered or encased by the housing 106 except for a portion exposed via that opening on the bottom of the housing 106. In such cases, the spherical member 108 may be supported by a low friction ring disposed at the edge of the opening and a low friction surface opposite the opening.

All drive wheels and rollers maintain contact with the spherical member 108 during rotation; however, the spherical member 108 does not necessarily maintain contact with the low friction ring(s) and/or surface.

The haptic navigation device 100 of FIG. 1 conveys or communicates the navigational message to the user via haptic feedback on the user's body part. The direction in which the spherical member 108 continuously rotates indicates the direction the user needs to travel according to the navigational message.

FIG. 1 illustrates the haptic navigational device 100 with two electromechanical motors 118, 120, and two rollers 112, 114; however, those skilled in the art will appreciate that any the number of motors and rollers can be fewer or more than two, to allow a reduced or increased degree of movement of the spherical member 108 within the housing 106. FIG. 1 further illustrates drive wheels 110, 116, and rollers 112, 114 with a concave shape complementary to the spherical member 108; however, those skilled in the art will appreciate that any the number of other suitable shapes exist and may be required to facilitate the necessary rotation of the spherical member 108.

Those skilled in the art will also appreciate that there are further mechanisms and arrangements that the haptic navigation device 100 may include. For example, rubber brushings or ball bearings may be used instead of rollers to support the spherical member 108 within the housing 106.

The haptic navigation device 100 further includes multiple hardware components in order to analyze a current location of a user relative to a received navigation message, and send calculated guidance signals to the motors 118, 120 of the haptic navigation device 100 in accordance with embodiments of the present invention disclosed herein. The multiple hardware components of the haptic navigation device 100 may include, but are not limited to, a processor 124, a wireless internet unit 126, a Global Positioning System (GPS) unit 128, and an accelerometer and a gyroscope unit 130.

The processor 124 compares the received navigation message with a geographical location of the user and translates the received navigation message into the guidance signals which cause the spherical member to rotate according to the received navigation message. More specifically, the processor 124 obtains the current geographical location data from the GPS unit 128 and the navigation message from the navigation APIs in accordance with embodiments of the present invention. The processor 124 also determines the current relative speed, motion, or orientation of the haptic navigational device 100 from the internal accelerometer and gyroscope unit 130. After determining a current geographical location of the user, the processor 124 also determines one or more next moves based on the received navigation message. The current geographical location and orientation data is used to calculate which direction the spherical member 108 needs to rotate in relation to the user's body part, and therefore which motor(s) to engage.

The wireless internet unit 126 is configured to receive navigation messages from a remote device, such as, for example a user's mobile phone in accordance with embodiments of the present invention. The remote device may function similar to the secondary device described below.

The GPS unit 128 includes a GPS receiver capable of receiving geolocation and time information from a satellite-based radio navigation system. Like conventional systems, the GPS unit 128 need not transmit any data, and it operates independently of any telephonic or internet reception, though such technologies can enhance the usefulness of the GPS positioning information. As previously described, the GPS unit 128 provides current geographical location data to the processor 124 for purposes of calculating guidance signals based on the received navigation message.

The accelerometer and a gyroscope unit 130 is used to determine relative speed, motion, or orientation of the haptic navigational device 100 at any given point in time. The GPS unit 128 could be used alone, or in cooperation with the accelerometer and a gyroscope unit 130, to determine the relative speed, motion, or orientation of the haptic navigational device 100 at any given point in time. The processor 124 will adjust or correct guidance signals based on the relative speed, motion, or orientation of the haptic navigational device 100 provided by the accelerometer and a gyroscope unit 130.

According to an alternate embodiment of the present invention, some functions of the hardware components described above may be carried out in a secondary processing device, such as, for example, a smartphone or a remote processing system on a cloud system such that the calculated guidance signals are sent to the haptic navigation device 100 as hardware commands, for engaging the necessary motors. The haptic navigation device 100 may be connected to the secondary processing device by a wired connection or a wireless connection via Bluetooth™ or WiFi. The haptic navigation device 100 may be connected to the remote processing system via Bluetooth or WiFi.

The secondary processing device may continuously request data from the GPS unit 128 and the accelerometer and gyroscope units 130, to calculate the navigation path as well as the guidance signal(s) the haptic navigation device 100 needs to engage the motors 118, 120 and communicate the directions to the user. Once the secondary processing device identifies which motor(s) to engage to move the spherical member 108 in a direction corresponding to a particular navigation message, the secondary processing device may continuously send commands to the haptic navigation device 100 such that the haptic navigation device 100 engages the necessary motors 118, 120 at each point of the user's journey. The frequency of the communication between the haptic navigation device 100 and the secondary processing device may depend on the wireless network conditions or pre-defined time intervals, for example, refreshing the guidance signal every second, five seconds or every minute.

If a smartphone is used as the secondary processing device, data from the additional sensors in the smartphone such as the camera and LIDAR sensors may be used as input to calculate the responsive guidance mode signals.

The interaction with the haptic navigation device 100, such as the input of the target location or the configuration of the various communication modes (for example, defining the meanings of the different speeds of rotation or the different patterns of vibrations) can be carried out in various ways. One example of an interaction method is a voice-controlled system where the user can interact with the haptic navigation device 100 using voice commands. The haptic navigation device 100 may further include sound input and sound output components, such as a microphone and speakers. The user may be prompted to input their target location by speaking aloud, and the haptic navigation device 100 will parse the spoken information using known speech-to-text methods to define the target location.

Another interaction method may use conventional touchscreen systems to obtain user input. The touchscreen may be on the haptic navigation device 100 itself in the form of a small LED display. If a secondary processing device such as a smartphone is used in conjunction with the haptic navigation device 100, a touchscreen of the secondary processing device could be used to input information and instructions to the haptic navigation device 100.

Figure 2A:
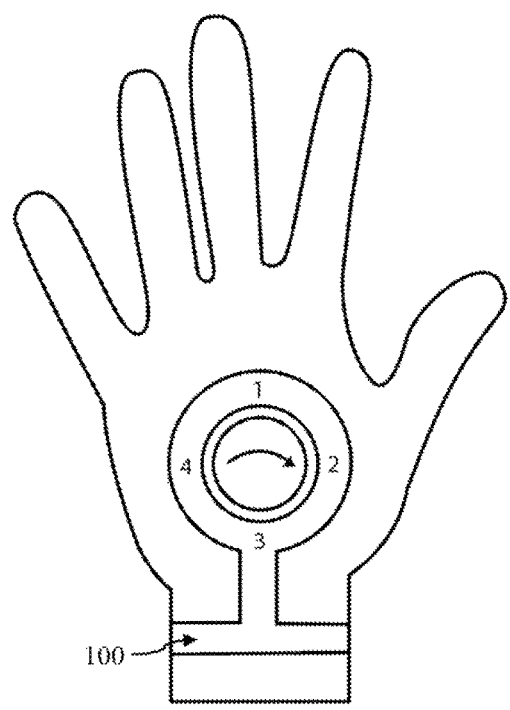
FIGS. 2A-2B illustrate the haptic navigation device attached to a user's wrist in accordance with an embodiment of the invention.
Figure 2B:
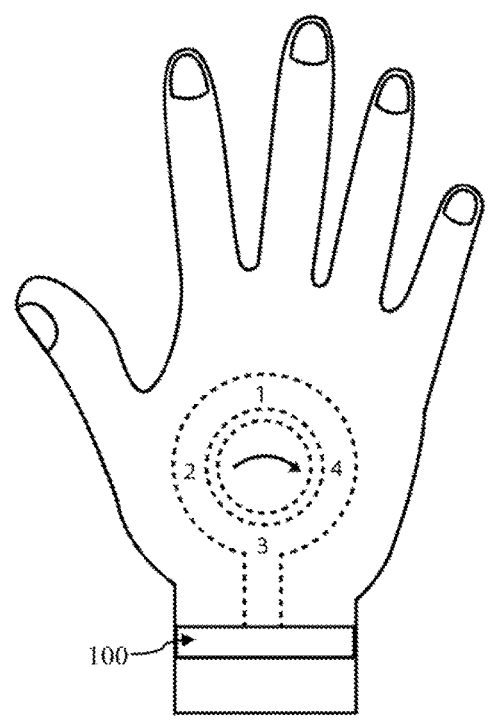

Referring now to FIG. 2, the haptic navigation device 100 is shown attached to a user's wrist with the spherical member 108 contacting the user's palm. In such examples, the user's hand is not stationary. For example, the orientation of the user's hand may alternate or change from being palm down or palm up. Specifically, FIG. 2A illustrates a scenario when the user's palm is facing up, while FIG. 2B illustrates a scenario when the user's palm is facing down. Since the haptic navigation device 100 is rigidly mounted, the orientation of the haptic navigation device 100 would also change in cooperation with the movement of the user's hand.

As previously described, the haptic navigation device 100 shown in FIGS. 2A and 2B is strapped to a user's wrist such that the spherical member 108 is in direct contact with the user's skin, such as, for example, the user's palm. For purposes of the present example, the housing 106 of the haptic navigation device 100 is divided into four sections and numbered 1, 2, 3 and 4, respectively. Such areas are merely for purposes of illustration and discussion and are not intended to describe any specific feature or limitation of the haptic navigation device 100.

According to the example of FIG. 2A, the user may hold the haptic navigation device 100 in front of them with their hand facing palm up. If, for example, the navigation message indicates a right turn 200, the guidance signals provided to the motors 118, 120 would cause the spherical member 108 to rotate to the right toward section 2 of the housing 106, as illustrated in FIG. 2A. More specifically, the motor 118 engages drive wheel 110 such that the spherical member 108 rotates in a direction which communicates to the user they should turn right. It is noted that rotation of the spherical member 108 toward section 2 of the housing 106 may include clockwise rotation and counter-clockwise rotation. The direction of rotation may be preferably pre-set; however, the user would have the ability to set the direction of rotation as a preference via, for example, a user interface.

If, for example, the navigation message indicates only a right turn, then the motor 120 would not engage drive wheel 116 causing the spherical member 108 to rotate only toward section 2 of the housing 106. In such cases, drive wheel 116 would remain motionless or substantially motionless. If the navigation message indicates, for example, a sharp right turn, then the motor 120 may also engage drive wheel 116 such that the spherical member 108 rotates generally toward section 2 of the housing 106, but in a direction which communicates to the user they should turn sharp right. As such, the guidance signal may cause both motors 118, 120 to engage both drive wheels 110, 116 to produce rotational movement of the spherical member 108 in a direction other than purely right/left or purely forward/backward.

To achieve this, the haptic navigation device 100 uses the accelerometer and gyroscope unit 130 to determine the relative speed, motion, or orientation of the haptic navigational device 100 at any given point along the journey. Before sending any guidance signal to the motors 118, 120, the processor 124 would account for the relative speed, motion, or orientation of the haptic navigational device 100.

According to the example of FIG. 2B, the user may hold the haptic navigation device 100 in front of them with their hand facing palm down. In such cases, the haptic navigation device 100 would function similarly as described above with reference to FIG. 2A; however, the spherical member 108 would rotate in a different direction based on its alternate orientation. For example, if the navigation message indicates a right turn 200, the guidance signals provided to the motors 118, 120 would cause the spherical member 108 to rotate to the right toward section 4 of the housing 106, as illustrated in FIG. 2B. More specifically, like with respect to the example illustrated in FIG. 2A, the motor 118 engages drive wheel 110 such that the spherical member 108 rotates in a direction which communicates to the user they should turn right; however, the spherical member 108 would rotate in a direction opposite that of the FIG. 2A due to its alternate orientation. As such guidance signals sent to the motors 118, 120 when the user's palm is facing up (FIG. 2A) will be different from guidance signals sent to the motors 118, 120 when the user's palm is facing down (FIG. 2B).

According to another example, the user may hold the haptic navigation device 100 in front of them with their hand facing palm up or facing palm down. If, for example, the navigation message indicates the users should travel straight, the guidance signals provided to the motors 118, 120 would cause the spherical member 108 to rotate toward section 1 of the housing 106, as illustrated in either FIG. 2A or 2B. More specifically, the motor 120 engages drive wheel 116 such that the spherical member 108 rotates in a direction which communicates to the user they should travel straight ahead. Like described above, the rotation of the spherical member 108 toward section 1 of the housing 106 may include clockwise rotation and counter-clockwise rotation which can be predetermined, or user selected based on personal preference.

In general, the haptic navigation device 100 can provide two modes of guidance to the user (a) active guidance and (b) responsive guidance. Active guidance refers to a mode which guides the user to a particular target location, based on the user's current geographical location and orientation, as described in detail above. Responsive guidance refers to a mode which alerts the user of local obstructions and thus guides the user away or around the local obstructions, as is described in detail below.

Figure 3:
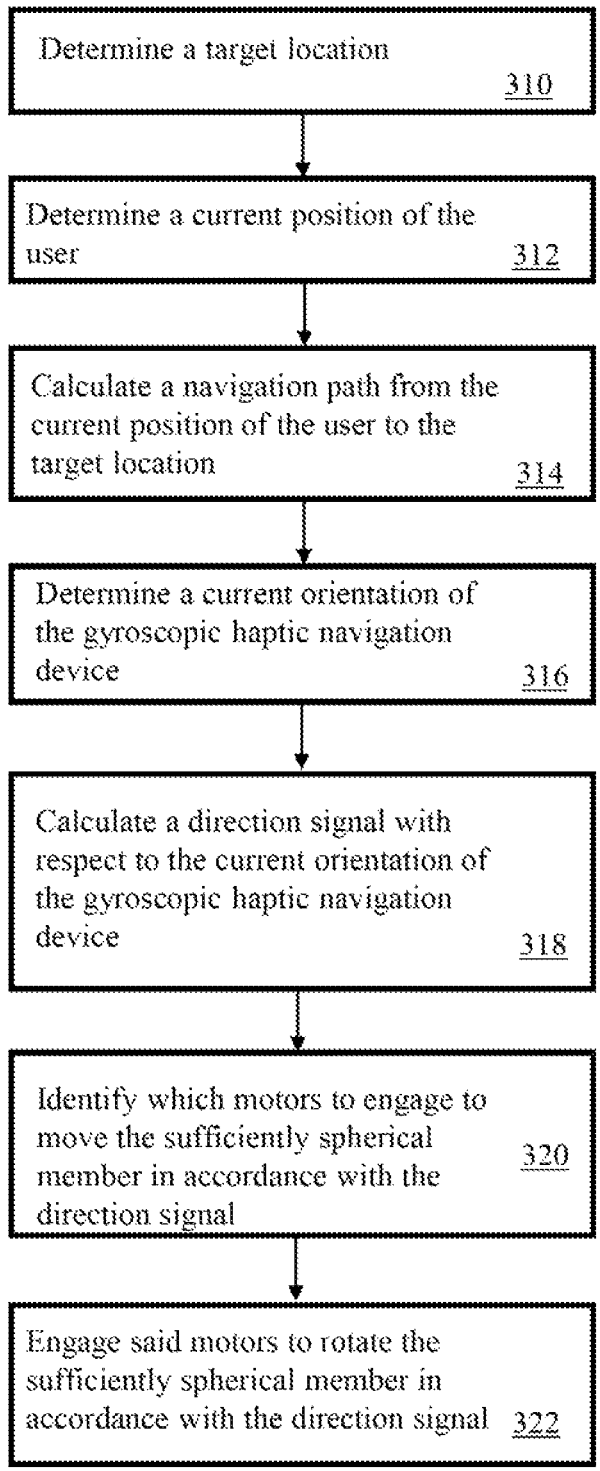
FIG. 3 is flow chart illustrating a method for operating the haptic navigation device in accordance with an embodiment of the invention.

Referring now to FIG. 3, a method 300 for operating the haptic navigation device 100 for active guidance is depicted, in accordance with embodiments of the present invention. At block 310, the method 300 determines a target location. This can be accomplished by manual user input via the user interface, such as, for example, speech-to-text input or textual input via a keyboard or touchscreen.

At block 312, the method determines the user's current geographical location using the GPS unit 128 of the haptic navigation device 100. At block 314, the method calculates a navigation path based on the user's current geographical location to the target location using conventional navigation methods, for example, using the Google™ Maps or Apple™ Maps application programming interfaces (APIs). At block 316, the method determines a current orientation of the haptic navigation device 100 from the internal accelerometer and gyroscope unit 130. At block 318, the method calculates a direction signal with respect to the current orientation of the haptic navigation device 100. At block 320, the method identifies which motor(s) to engage to move the spherical member 108 in accordance with the direction signal. At block 322, the method engages the motors 118, 120 to rotate the spherical member 108 in accordance with the direction signal.

In some embodiments, blocks 310-320, may be carried out in a secondary processing device such as a smartphone or a remote processing system on a cloud system such that the calculated guidance signals are sent to the haptic navigation device 100 as hardware commands, for engaging the necessary motors. The haptic navigation device 100 may be connected to the secondary processing device by a wired connection or a wireless connection via Bluetooth™ or WiFi. The haptic navigation device 100 may be connected to the remote processing system via Bluetooth or WiFi.

Figure 4:
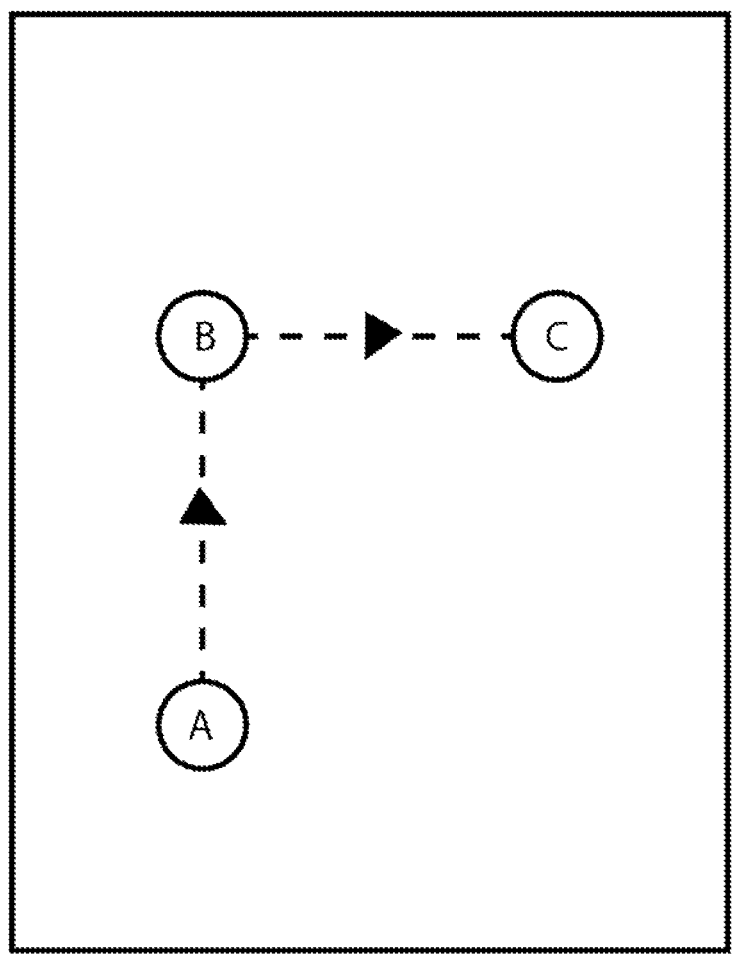
FIG. 4 illustrates a map showing a user's route in accordance with an embodiment of the invention.

Referring now to FIG. 4, a map is shown depicting a user's route in accordance with an embodiment of the invention. Consider, for example, a user traveling from starting position A to target position C. When the user is at the starting position A, the processor 124 obtains the current geographical location data from the GPS unit 128. The processor 124 then determines the current orientation information of the haptic navigation device 100 from the internal accelerometer and gyroscope unit 130. In accordance with the present example the processor 124 determines, while the user is stationary at the starting position A, that the user needs to move forward until the user reaches an intermediate position B.

If in the present example, the user is holding the haptic navigation device 100 in front of them with their hand facing palm up the processor 124 will calculate and provide guidance signals to the motors 118, 120. Such guidance signals causing the spherical member 108 to rotate toward section 1 (FIGS. 2A, 2B) of the housing 106. More specifically, the motor 120 engages drive wheel 116 such that the spherical member 108 rotates in a direction which communicates to the user they should travel straight ahead, in toward the intermediate position B.

Upon arrival of the user at the intermediate position B, the processor 124 obtains a new current geographical location data from the GPS unit 128, and determines a new current orientation information from the internal accelerometer and gyroscope unit 130. In accordance with the present example the processor 124 then determines, while the user is stationary at the intermediate position B, that the user needs to turn right. The processor 124 will calculate and provide new guidance signals to the motors 118, 120 based on the user's new location. The new guidance signals provided to the motors 118, 120 would cause the spherical member 108 to rotate to the right toward section 2 (FIGS. 2A, 2B) of the housing 106. More specifically, the motor 118 engages drive wheel 110 such that the spherical member 108 rotates in a direction which communicates to the user they should turn right.

According to yet another embodiment of the present invention, the haptic navigation device 100 may progressively change the angle of direction of rotation of the spherical member 108 toward a particular direction as the user gets closer to a turning point, for example, the intermediate position B. In such cases, the haptic navigation device 100 need not be stationary, and guidance signals are calculated in real time based on real time data from the GPS unit 128, the accelerometer and a gyroscope unit 130, or both. For example, the processor 124 can continuously detect changes to the geographical location of the user and the orientation or the haptic navigation device and recalculate, in real time, the guidance signal based on those detected changes. Further, in accordance with the present embodiment, the axis of rotation of the spherical member 108 does not remain static. Instead, the axis of rotation of the spherical member 108 may change as the user travels, for example, from the starting position A to the intermediate position B. For example, the axis of rotation will be oriented perpendicular to the direction of intended travel. In some cases, the axis of rotation is in the same plane as the drive wheels 110, 116 and the rollers 112, 114 as well as being oriented perpendicular to the direction of intended travel.

According to yet another embodiment of the present invention, the guidance signals calculated by the processor 124 may further include vibrational, spinning and patterned movement. For example, the spherical member 108 may vibrate to notify the user they are approaching a turning point or obstacle. The vibrating notification may have a range of intensity, for example, increasing as a distance from a turning point or obstacles decreases. Alternatively, varying the speed of rotation of the spherical member 108 may signify, and thus communicate, additional guidance information to the user. For example, the spherical member 108 may rotate faster or slower to notify the user they are approaching a turning point or obstacle. The rotation speed of the spherical member 108 may progressively (continuously) change, for example gradually increase, as a distance from a turning point or obstacles decreases, or vice versa.

The haptic navigation device 100 described herein can offer additional information about upcoming turns and environmental conditions than conventional haptic navigation devices currently offer. The additional information and communication modes can be tailored to the user's needs and preferences.

To achieve a responsive guidance mode, the haptic navigation device 100 may further include additional sensors for mapping the local environment of the user's journey. This may include Light Detection and Ranging (LIDAR) sensors, visual sensors or motion sensors that are suitable for identifying local obstructions in the user's path.

Figure 5:
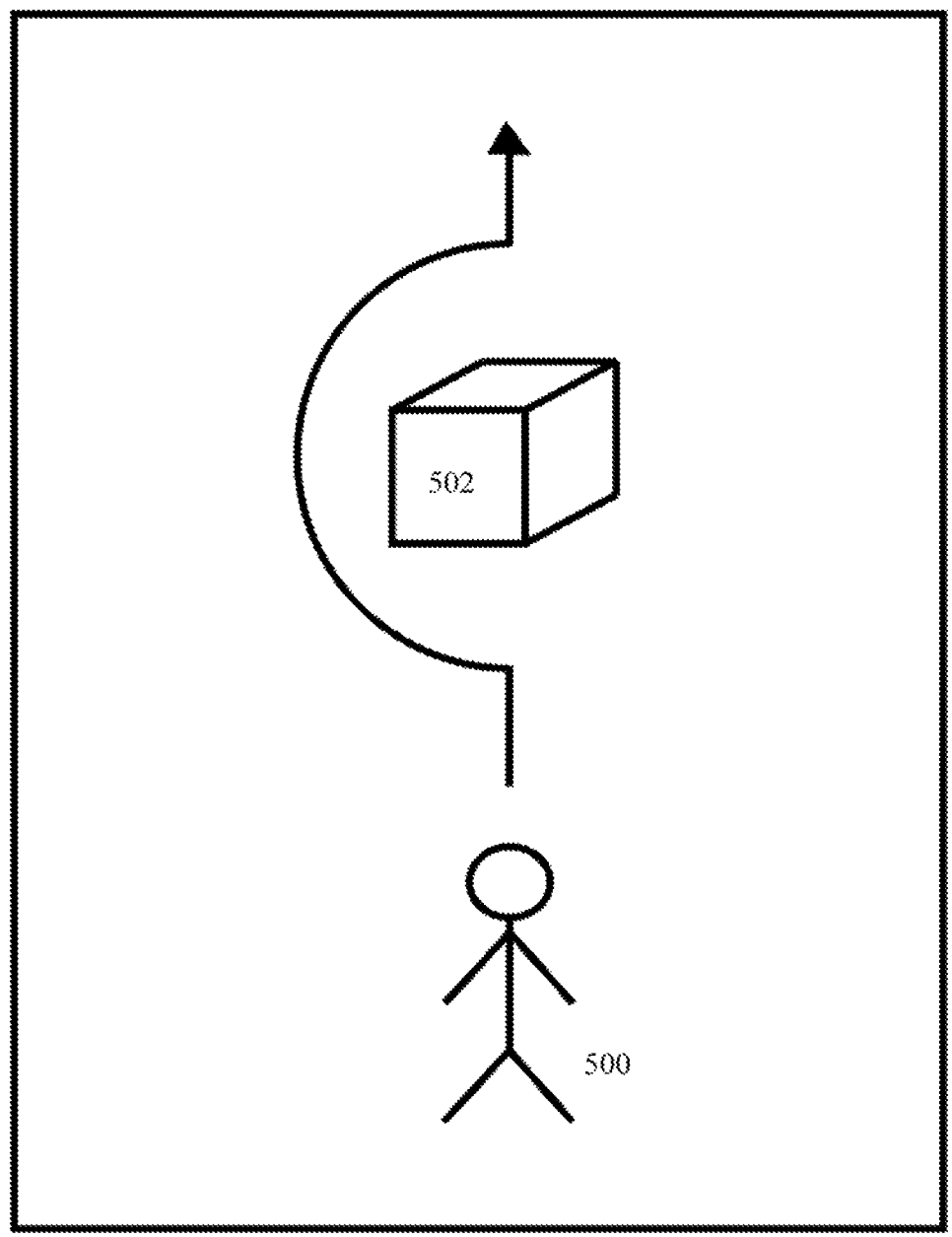
FIG. 5 illustrates a map showing a user's route around an obstacle in accordance with an embodiment of the invention.

Referring now to FIG. 5, a map is shown depicting a user's route in accordance with an embodiment of the invention. Consider, for example, a user 500 approaching an obstacle 502 and the haptic navigation device 100 navigating the user around the obstacle. In such cases, the user will be alerted of the obstacle 502, for example, by one or more active guidance signals such as vibrating, changes rotation speed of the spherical member 108, or some patterned movement of the spherical member 108. Preferably, any movement of the spherical member 108 communicating the presence of the obstacle 502 may be different that typical rotation of the spherical member 108 during ordinary navigation.

As may be used herein, the terms "substantially" and "approximately" provide an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (for example, an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may still further be used herein, the term "associated with", includes direct and/or indirect coupling of separate items and/or one item being embedded within another item.

As may also be used herein, the terms "processing system", "processing module", "processing circuit", "processor", and/or "processing unit" may be used interchangeably and may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing system, processing module, module, processing circuit, and/or processing unit may be, or further include, memory and/or an integrated memory element, which may be a single memory device, a plurality of memory devices, and/or embedded circuitry of another processing system, processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing system, processing module, module, processing circuit, and/or processing unit includes more than one processing device, the processing devices may be centrally located (for example, directly coupled together via a wired and/or wireless bus structure) or may be distributedly located (for example, cloud computing via indirect coupling via a local area network and/or a wide area network). Further note that if the processing system, processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing system, processing module, module, processing circuit, and/or processing unit executes, hard coded and/or operational instructions corresponding to at least some of the steps and/or functions illustrated in one or more of the figures. Such a memory device or memory element can be included in an article of manufacture.

Figure 6:
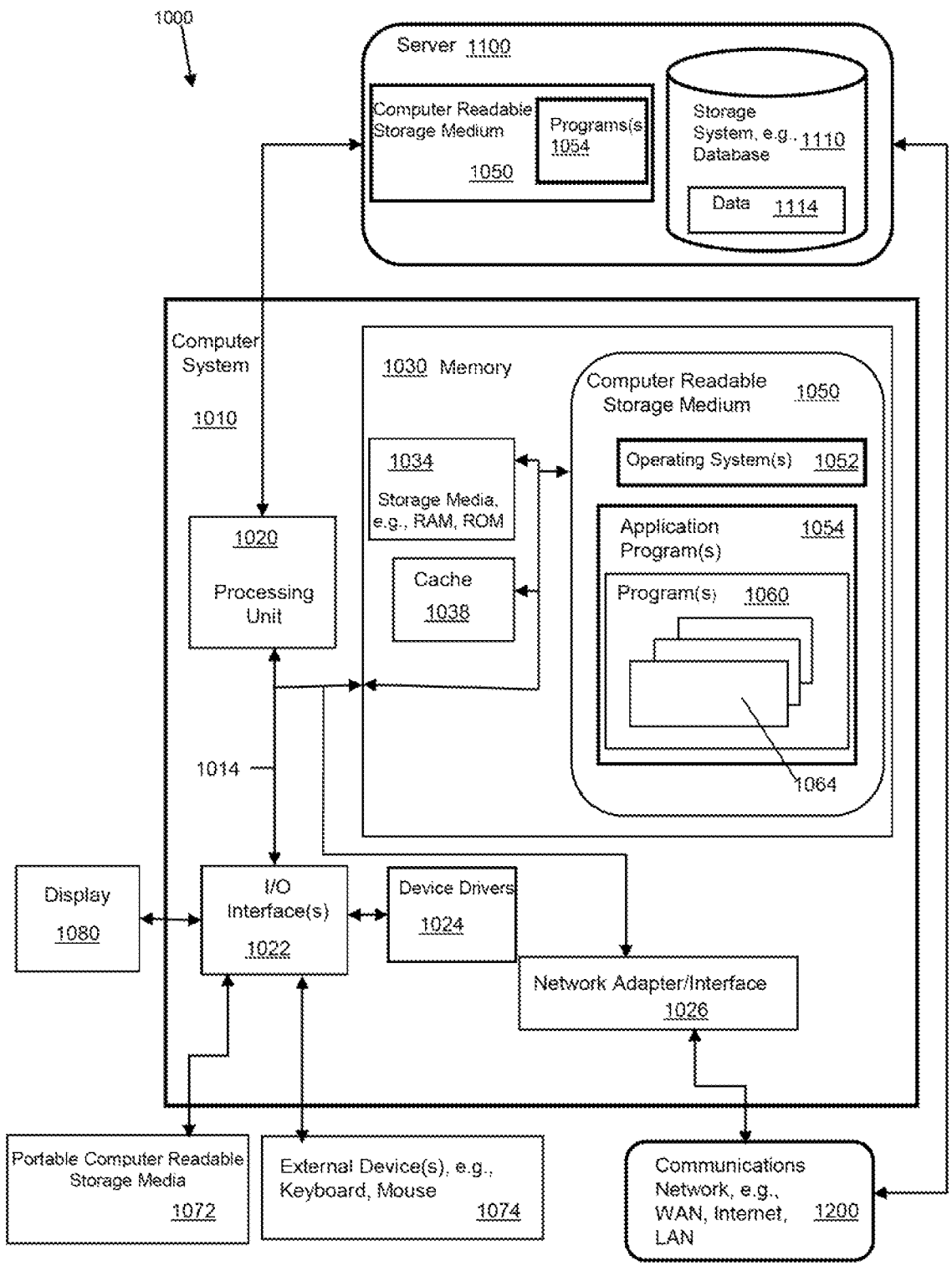
FIG. 6 is a block diagram depicting the hardware components of a system, for operating a haptic navigation device in accordance with an embodiment of the invention.

The navigation device 100 may include internal and external hardware components, as described in further detail below with reference to FIG. 6. It should be appreciated that FIG. 6 provides only an illustration of one implementation and does not imply any limitations with regard to the environments in which different embodiments may be implemented. Many modifications to the depicted environment may be made. In other embodiments, the navigation device 100 may operate in a cloud computing environment, as is described below with reference to FIGS. 7 and 8.

Referring to FIG. 6, a system 1000 includes a computer system or computer 1010 is shown. The method 300, for example, may be embodied in a program(s) 1060 (FIG. 6) embodied on a computer readable storage device, for example, generally referred to as memory 1030 and more specifically, computer readable storage medium 1050 as shown in FIG. 6. For example, memory 1030 can include storage media 1034 such as RAM (Random Access Memory) or ROM (Read Only Memory), and cache memory 1038. The program 1060 is executable by a processing unit (i.e. processor) 1020 of the computer system 1010 (to execute program steps, code, or program code). Additional data storage may also be embodied as a database 1110 which can include data 1114. The computer system 1010 and the program 1060 shown in FIG. 6 represent a computer and program that may be local to a user, or provided as a remote service (for example, as a cloud based service), and may be provided in further examples, using a website accessible using a communications network 1200 (for example, interacting with a network, the Internet, or cloud services). It is understood that the computer system 1010 also represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network shown as the communications network 1200.

The computer system 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are represented in FIG. 6 as program modules 1064. The program 1060 and program modules 1064 can execute specific steps, routines, sub-routines, instructions or code, of the program.

Embodiments of the present disclosure can be run locally on a device such as a mobile device, or can be run a service, for instance, on the server 1100 which may be remote and can be accessed using the communications network 1200. The program or executable instructions may also be offered as a service by a provider. The computer system 1010 may be practiced in a distributed cloud computing environment where tasks are performed by remote processing devices that are linked through the communications network 1200. In a distributed cloud computing environment, program modules may be located in both local and remote computer system storage media including memory storage devices.

More specifically, as shown in FIG. 6, the system 1000 includes the computer system 1010 shown in the form of a computing device with illustrative periphery devices. The components of the computer system 1010 may include, but are not limited to, one or more processing units 1020, a system memory 1030, and a bus 1014 that couples various system components including system memory 1030 to processing unit 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system 1010 can include a variety of computer readable media. Such media may be any available media that is accessible by the computer system 1010 (for example, computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer system 1010 may further include other removable/non-removable, volatile/non-volatile computer storage media, in one example, portable computer readable storage media 1072. In an embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the database 1110 (for example, a storage system) for storing data 1114 and communicating with the processing unit 1020. The database can be stored on or be part of a server 1100. Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 300 (FIG. 3), for example, may be embodied in one or more computer programs 1060 (hereinafter "program"), and can be stored in the memory 1030 in the computer readable storage medium 1050. The program 1060 can include program modules 1064. The program modules 1064 carry out functions and/or methodologies of embodiments of the present invention as described herein. The program 1060 is stored in memory 1030 and is executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer system 1010 may also communicate with one or more external devices 1074 such as a keyboard, a pointing device, a display 1080, etc.; one or more devices that enable a user to interact with the computer system 1010; and/or any devices (for example, network card, modem, etc.) that enables the computer system 1010 to communicate with one or more other computing devices. Such communication can occur via the Input/Output (I/O) interfaces 1022. Still yet, the computer system 1010 can communicate with the communications network 1200, such as, for example, a local area network (LAN), a general wide area network (WAN), and/or a public network (for example, the Internet) via network adapter/interface 1026. As depicted, network adapter 1026 communicates with the other components of the computer system 1010 via bus 1014. It should be understood that although not shown, other hardware and/or software components could be used in conjunction with the computer system 1010. Examples, include, but are not limited to: microcode, device drivers 1024, redundant processing units, external disk drive arrays, RAID systems, tape drives, and data archival storage systems, etc.

It is understood that a computer or a program running on the computer system 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In an embodiment, the computer system 1010, including a mobile device, can use the communications network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (for example, mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
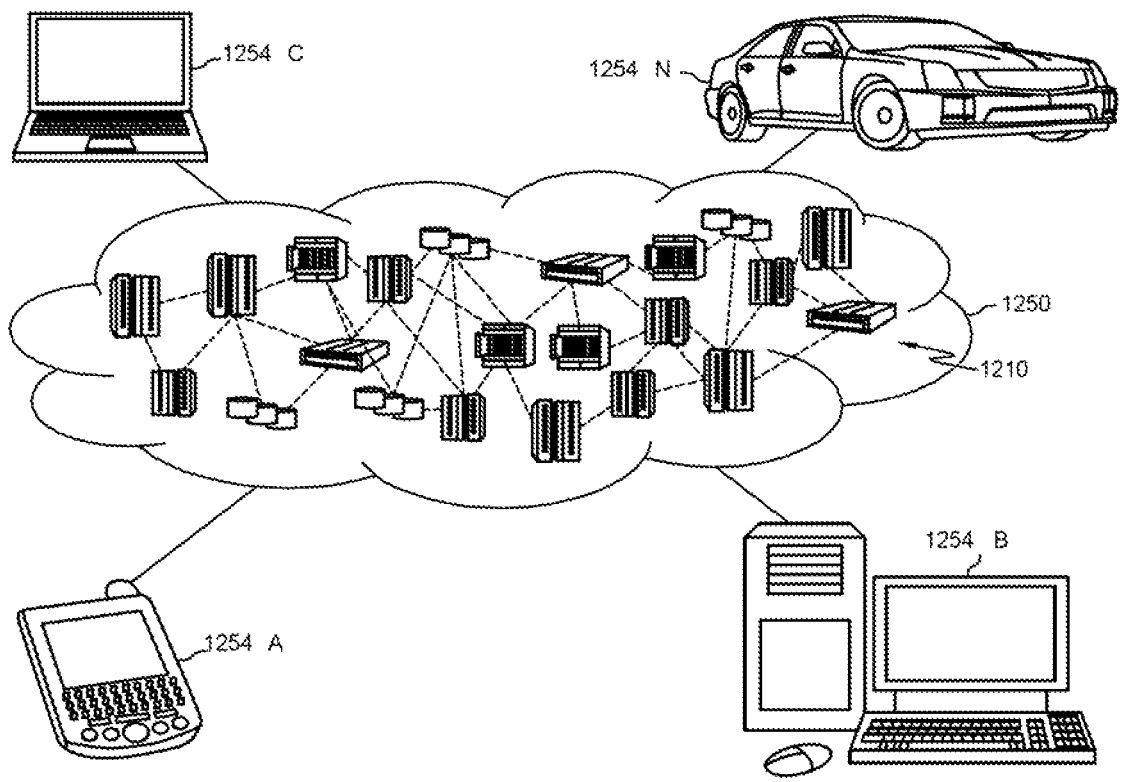
FIG. 7 is a functional block diagram depicting a cloud computing environment, in accordance with an embodiment of the invention.

Referring now to FIG. 7, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 7 are intended to be illustrative only and that computing nodes 1210 and cloud computing environment 1250 can communicate with any type of computerized device over any type of network and/or network addressable connection (for example, using a web browser).

Figure 8:
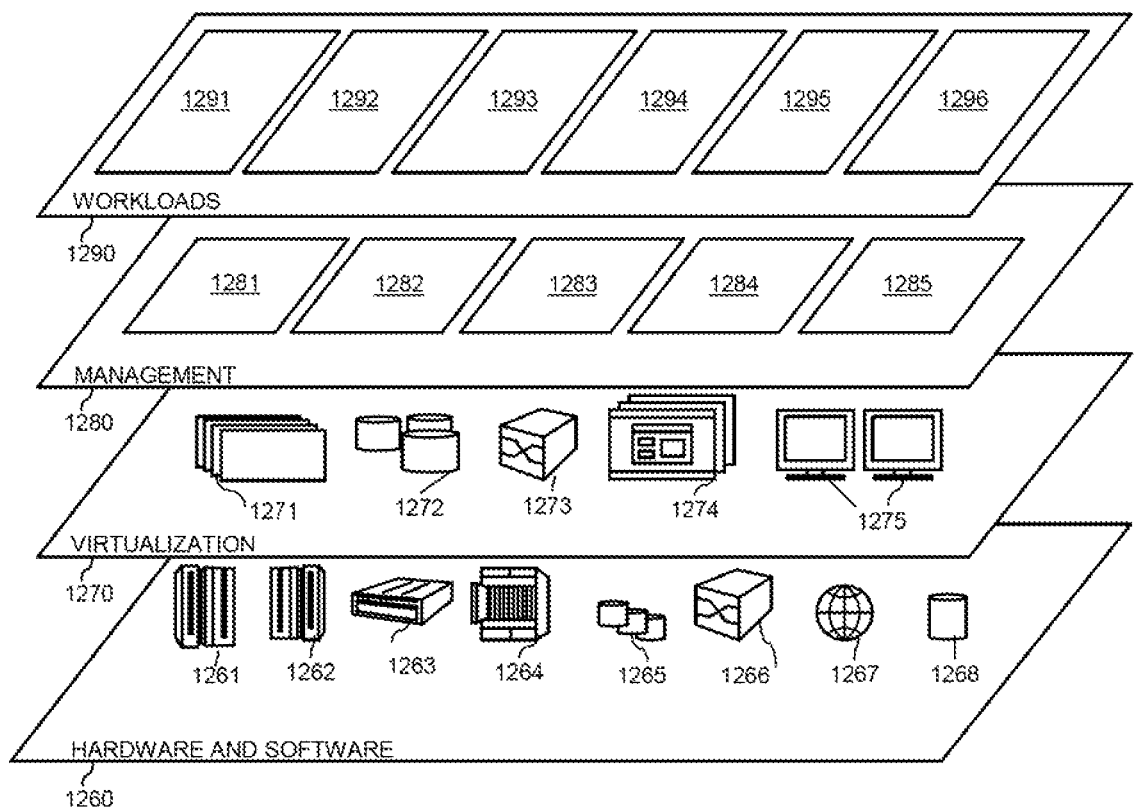
FIG. 8 is a diagram depicting abstraction model layers provided by the cloud computing environment of FIG. 7, in accordance with an embodiment of the invention.

Referring now to FIG. 8, a set of functional abstraction layers provided by cloud computing environment 1250 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include mapping and navigation 1291; software development and lifecycle management 1292; virtual classroom education delivery 1293; data analytics processing 1294; transaction processing 1295; and assessing conditions and recommending modifications 1296.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A navigation device comprising:
    a housing comprising an opening, two or more drive wheels, and two or more rollers;
    a spherical member located within the opening of the housing in direct contact with the two or more drive wheels and the two or more rollers such that the drive wheels control rotation of the spherical member in response to guidance signals received from a processor; and
    an attachable member coupled directly to the housing for securing the navigation device to a body part of a user and maintaining contact between the user's skin and the spherical member.

2. The navigation device according to claim 1, further comprising:
    a global positioning system unit for determining a geographical location of the user; and
    a wireless internet unit to receive a navigation message from a remote device,
    wherein the processor compares the received navigation message with the geographical location of the user and translates the received navigation message into the guidance signals which cause the spherical member to rotate according to the received navigation message.

3. The navigation device of claim 1, further comprising:
    an accelerometer and a gyroscope for measuring a relative orientation of the navigation device, whereby data produced by the accelerometer and the gyroscope are used by the processor to generate the guidance signals.

4. The navigation device according to claim 1, wherein the attachable member is an article of clothing wearable by the user.

5. The navigation device according to claim 1, wherein the attachable member comprises:
    a strap comprising a rigid material shaped to fit the body part of a user; and
    an extension member joining the housing with the strap, the extension member comprising an elastic material in a shape sufficient to maintain contact between the spherical member and the body part of a user.

6. The navigation device according to claim 1, wherein an axis of rotation of the spherical member is perpendicular to a direction of travel indicated by a navigation message.

7. The navigation device according to claim 1, wherein the two or more drive wheels and the two or more rollers are all arranged in a single plane.

8. The navigation device according to claim 1, wherein the housing comprises at least two motors coupled to the two or more drive wheels for controlling the rotational movement of the spherical member.

9. The navigation device according to claim 1, wherein the spherical member comprises tactile ridges or tactile grooves.

10. A navigation device comprising:
    a housing comprising an opening, two or more drive wheels, and two or more rollers, wherein the two or more drive wheels and the two or more rollers are all arranged in a single plane;
    a spherical member located within the opening of the housing in direct contact with the two or more drive wheels and the two or more rollers such that the drive wheels control rotation of the spherical member in response to guidance signals received from a processor, wherein an axis of rotation of the spherical member is perpendicular to a direction of travel indicated by a navigation message; and
    an attachable member coupled directly to the housing for securing the navigation device to a body part of a user and maintaining contact between the user's skin and the spherical member.

11. The navigation device according to claim 10, further comprising:
    a global positioning system unit for determining a geographical location of the user; and
    a wireless internet unit to receive the navigation message from a remote device,
    wherein the processor compares the received navigation message with the geographical location of the user and translates the received navigation message into the guidance signals which cause the spherical member to rotate according to the received navigation message.

12. The navigation device according to claim 10, further comprising:
    an accelerometer and a gyroscope for measuring a relative orientation of the navigation device, whereby data produced by the accelerometer and the gyroscope are used by the processor to generate the guidance signals.

13. The navigation device according to claim 10, wherein the attachable member is an article of clothing wearable by the user.

14. The navigation device according to claim 10, wherein the attachable member comprises:
    a strap comprising a rigid material shaped to fit the body part of a user; and
    an extension member joining the housing with the strap, the extension member comprising an elastic material in a shape sufficient to maintain contact between the spherical member and the body part of a user.

15. The navigation device according to claim 10, wherein the housing comprises at least two motors coupled to the two or more drive wheels for controlling the rotational movement of the spherical member.

16. The navigation device according to claim 10, wherein the spherical member comprises tactile ridges or tactile grooves.

17. A method comprising:
    receiving, by a haptic navigation device worn by a user, a navigation message from a remote device;
    determining a geographical location of the user from a global positioning unit of the haptic navigation device;
    determining a orientation of the haptic navigation device from a gyroscope integrated into the haptic navigation device;

calculating a guidance signal based on the received navigation message, the geographical location of the user, and the orientation of the haptic navigation device; and sending the guidance signal to two or more motors causing a spherical member of the haptic navigation device to rotate, wherein the rotation of the spherical member corresponds to the received navigation message.

18. The method according to claim 17, further comprising:

detecting changes to the geographical location of the user and the orientation or the haptic navigation device; and recalculating the guidance signal based on the detected changes to the geographical location of the user and the orientation or the haptic navigation device.

19. The method according to claim 17, further comprising:

identifying an obstacle along a travel path of the user; and progressively adjusting a rotation speed of the spherical member in response to identifying the obstacle along the travel path of the user, wherein the rotation speed of the spherical member increases as a distance between the user and the obstacle decreases, or vice versa.

20. The method according to claim 17, further comprising:

identifying an obstacle along a travel path of the user; and causing the spherical member to vibrate in response to identifying the obstacle along the travel path of the user.

* * * * *